United States Patent [19]

Yamamoto et al.

[11] Patent Number: 4,750,821

[45] Date of Patent: Jun. 14, 1988

[54] ZOOM LENS ASSEMBLY

[75] Inventors: Hiroshi Yamamoto; Keiji Ikemori, both of Kanagawa, Japan

[73] Assignee: Canon Kabushiki Kaisha, Tokyo, Japan

[21] Appl. No.: 768,408

[22] Filed: Aug. 22, 1985

[30] Foreign Application Priority Data

Aug. 24, 1984 [JP] Japan .......................... 59-127606[U]
Sep. 6, 1984 [JP] Japan .......................... 59-134546[U]
Nov. 5, 1984 [JP] Japan .......................... 59-166514[U]

[51] Int. Cl.⁴ ............................................. G02B 7/04
[52] U.S. Cl. ............................. 350/429; 250/231 SE
[58] Field of Search .................... 350/429, 430; 250/231 SE; 354/195.1, 400, 402

[56] References Cited

U.S. PATENT DOCUMENTS

| | | | |
|---|---|---|---|
| 3,972,056 | 7/1976 | Tsujimoto et al. | 350/430 |
| 4,275,952 | 6/1981 | Uesugi | 350/429 |
| 4,342,025 | 7/1982 | Spälti et al. | 250/231 SE |
| 4,422,065 | 12/1983 | Radomirov et al. | 250/231 SE |
| 4,465,928 | 8/1984 | Breslow | 250/231 SE |
| 4,605,286 | 8/1986 | Sumi | 350/429 |

Primary Examiner—Bruce Y. Arnold
Assistant Examiner—Loha Ben
Attorney, Agent, or Firm—Toren, McGeady & Associates

[57] ABSTRACT

A zoom lens optical system having the focusing provision at a rear zoom component with an automatic mechanism for varying its axial position as a function of the focal length of the entire system with an object at a constant distance. The automatic mechanism includes a motor whose stator and rotor are formed to hollow cylindrical shapes and a device for producing a driving signal for the motor with the power density thereof varying with the variation of the focal length.

9 Claims, 5 Drawing Sheets

ZOOM LENS ASSEMBLY

BACKGROUND OF THE INVENTION

1. Field of the Invention

This invention relates to mechanical mountings for zoom lens optical systems of the rear focusing type in which the position of a sharp image of the same object is caused to vary as the focal length varies, and more particularly, to a motor driven focusing mechanism for a compensator lens of such zoom lens with automatic means making it possible to correct deviation of the position of the sharp image from the focal plane.

2. Description of the Prior Art

To the mechanical mountings for zoom lens systems of the type in which when the focal length changes, the position of a sharp image of the same object is caused to move away from the focal plane, there has been the technique of bringing the object image back to the focal plane by moving the lens system as a whole or in part shown in U.S. Pat. No. 3,972,056.

The automatic focusing technique for such deviation correcting mechanism by using a motor built in the lens barrel is also known by Japanese Laid-Open Patent Application No. SHO 58-10706 (corresponding to U.S. patent application Ser. No. 396,030, filed July 7, 1982 now U.S. Pat. No. 4,534,624) and U.S. Pat. No. 4,52,060.

In the zoom lens of the type described above, the higher the focal length, the larger the correcting movement must be made, because the total focusing movement in the telephoto end is longer than in the wide angle end. So, as zooming takes place, the actual value of the focal length must be read out to determine what correcting distance the focusing lens moves. To fulfill such a technical requirement, a novel technical idea is necessarily worked out to a good harmony (structural unity) of zooming and focusing mechanisms since it is difficult to realize it when the conventional structure of motor is employed for incorporation of the focusing mechanism in the lens mounting.

3. Summary of the Invention

A first object of the invention is to provide a mechanical mounting for a zoom lens whose image plane for the same object is caused to change in position when the focal length changes, whereby the deviation of the image plane is corrected by a motor, particularly of the hollow cylindrical form.

In particular, a lens holder containing the one of the zoom components, which also serves as a focusing component, is formed to such a shape as to accommodate the hollow cylindrical motor.

A second object is to provide for the hollow cylindrical motor with means for detecting a change of the focal length so that the number of driving pulses applied to the motor varies continuously or stepwise with the focal length, whereby, on assumption that the motor axially moves the focusing lens to correct the deviation of the image plane by a prescribed distance for every one driving pulse, the correcting movement is varied as a function of the focal length.

In concomitance to the first and second objects, another object of the invention is to provide an arrangement of the aforesaid detecting means between the hollow cylindrical motor and the lens holder that carries the motor which enables the use of the hollow cylindrical type motor to produce a great advantage.

A third object of the invention is to provide a mechanical mounting for a zoom lens optical system of the rear focusing type with a safety mechanism.

In this connection, it should be explained that as the focal length increases, the range of movement of the focusing component increases to overlap the range of movement of the adjacent zoom component thereto, as will be understood from FIG. 5, where interaction between zooming and focusing is shown by a parameter representing the object distance.

That is, the axial position of the focusing lens for the wide angle position differs from that for the telephoto position. Taking a practical example, after the zoom lens has been sharply focused to an object distance of 5 meters in the wide angle position, when zooming is then carried out to the telephoto position, the focusing component has to be moved forward to re-establish the in-focus condition.

Since the automatic focusing control device can, however, be designed in such a way that the corrected focusing movement is superimposed on the zooming movement, there is no possibility of occurrence of a mechanical interference between the focusing component and the adjacent zoom component at any position in the focusing range. The lens system is, on the other hand, designed usually on the assumption that zooming and focusing are operated independently of each other. To avoid accidental interference, therefore, mechanical means must be provided for limiting the total axial movement of the focusing lens depending on the focal length.

In order to selectively operate the automatic and manual focusing modes, the mechanical mounting for such a zoom lens must be provided with a safety mechanism in the form of mechanical stoppers cooperative with the focusing mechanism. Otherwise, if automatic focusing is followed by visual focusing, a mechanical interference between the lens components will often occur. Also, in special photographic situations where the automatic focusing control device cannot be relied on because, for example, the contrast is poor, the lighting is dim, or the actual object distance is shorter than the minimum value of the focusing range of the lens, it will happen that the focusing lens is left beyond the prescribed range of movement thereof, as the focal length decreases with a decrease in the total focusing movement.

BRIEF DESCRIPTION OF THE DRAWINGS

FIGS. 1 to 3 illustrated an embodiment of a mechanical mounting for a rear focusing type zoom lens optical system with a motor driven focusing mechanism for a compensator according to the present invention, in which FIG. 1 is a perspective view of an arrangement of the detecting means constituting part of a device for producing driving signals for the motor, and FIGS. 2 and 3 are longitudinal section views of the mounting mechanism in different zooming positions.

DETAILED DESCRIPTION OF THE PREFERRED EMBODIMENTS

Figure 2:
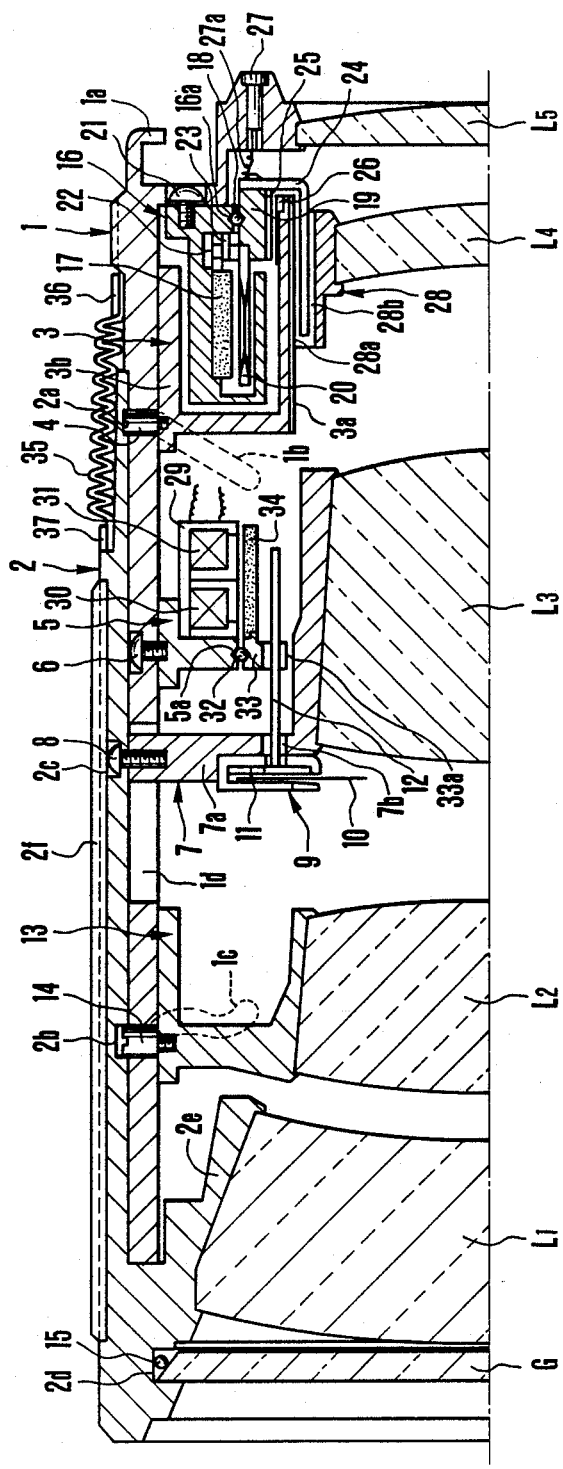
Figure 3:
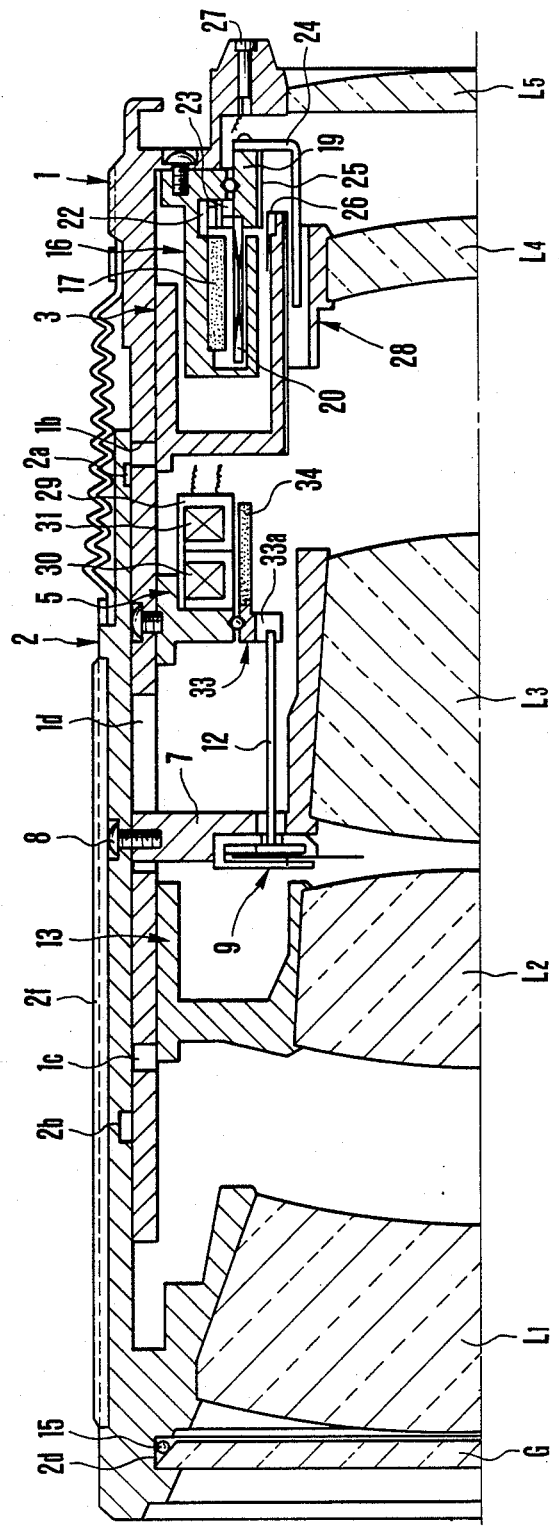

The present invention will next be described in connection with a first embodiment thereof with reference to FIGS. 1 to 3. Referring first to FIGS. 2 and 3, a body tube 1 is releasably attachable to a camera body (not shown) by a mount portion 1a at the rear end thereof and fixedly carries a relay lens L5. A zoom barrel 2 is axially movably fitted on the outer diameter of the body tube 1 and has two camming grooves 2a and 2b formed in the inner surface thereof. The front end of the zoom barrel 2 is covered by a protection glass plate G fitted in an inner circumferential groove 2d with an O-shaped ring 15 of elastic material to form a watertight structure. Just behind the plate G there is a first lens component L1 fixedly secured to the barrel 2 by a holder 2e. The outer surface of the barrel 2 is covered by a rubber knurl 2f. A movable double-tubular sleeve 3 is fitted in the inner diameter of the body tube 1 at an outer contact area 3b of large diameter. A cam follower pin 4 radially extends from the outer tubular member of the sleeve 3 through the camming slot 1b into a circumferential groove 2a formed in the inner surface of the zoom barrel 2. A female helicoid 3a is cut in the inner surface of the tubular member of small diameter of the sleeve 3 and meshes with a male helicoid 28a formed in the outer surface of a rear lens cell 28 containing a rear zoom component L4 which also serves as a focusing component.

An inner ring 5 is fixedly fitted in the inner diameter of the body tube 1 by a screw fastener 6 and has an apertured cross-wall whose rear shoulder fixedly carries a stator 29 and a pair of coils 30 and 31 constituting a hollow cylindrical stepping motor for driving a diaphragm together with a rotor 33 which is mounted through a ball bearing 32 in the aperture 5a of the cross-wall. A ring-shaped permanent magnet 34 is fixedly mounted to the rotor 33 in radial alignment with the coils 30 and 31. A second lens cell 7 containing a zoom component L3 has a flange 7a movably fitted in the inner diameter of the body tube 1. A radial projection extends outwardly of the flange 7a through a longitudinally elongated slot 1d of the body tube 1 to contact with the inner surface of the zoom barrel 2 so that the second lens cell 7 is fixedly secured to the zoom barrel 2 by a screw fastener 8. A diaphragm unit 9 is mounted on the front shoulder of the flange 7a, and is constructed, as well known in the art, from blades 10 and a drive ring 11. A drive connection rod 12 axially extends rearwardly of the drive ring 11 through an arcuate slot 7b of the flange 7a to engage in an axial hole 33a of the rotor 33, so that when the rotor 33 rotates, the drive ring 11 rotates.

A first lens cell 13 containing a zoom component L2 is movably fitted in the inner diameter of the body tube 1 and has a cam follower pin 14 extending through a front camming slot 1c of the body tube 1 into the circumferential groove 2b of the zoom barrel 2.

An electromagnetic motor for driving the focusing lens is in the form of a hollow cylindrical coreless motor within a casing 16 fixedly mounted to the front shoulder of the rear cross-wall of the body tube 1 by a screw fastener 21 and axially extending forward into a space formed between the outer and inner tubular members of the movable sleeve 3. The casing 16 also serves as a yoke necessary to a magnetic circuit. The coreless motor comprises a ring-shaped permanent magnet 17, a rotor 19 mounted through a ball bearing 18 to a cross-wall of the casing 16 at an apertured portion 16a thereof, a coil 20 fixedly mounted to the rotor 19 and arranged in radial alignment with the magnet ring 17, and a pair of brushes 22 fixedly secured to the inner surface of the casing 16 and arranged in contact with a commutator 23. A rotation transmitting key 24 of letter "L" shape is fixedly secured at its radial stroke to the rotor 19 and is slidably engaged at its axial stroke in a longitudinally elongated groove 28b provided in the rear lens cell 28.

Figure 1:
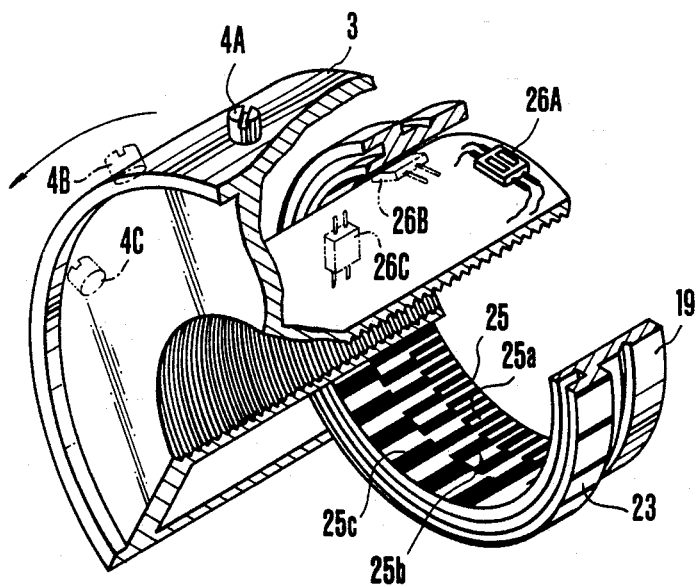

Referring now to FIG. 1, the inner surface of the rotor 19 is provided with a pulse substrate 25, and a detector. In this instance, a photo-detector 26 is arranged on the outer surface of the inner tubular member of the movable sleeve 3 to face, selectively, three rows of pulse patterns 25a, 25b and 25c of different pitch between two successive white or black areas, the rows being positioned in axial side by side relation to each other. Such a pulse substrate may be made by printing the patterns on an aluminum foil or like material of high reflectivity by using an anti-reflection ink and then by applying the printed aluminum foil to the inner surface of the rotor 19. The photo-detector 26 comprises, in combination, a light-emitting element and a photosensitive element. Light issuing from the light-emitting element impinges on the pulse substrate 25 and the reflected light therefrom enters the photosensitive element, whereby because the light reflective areas and the opaque or light absorptive areas alternate each other in each of the rows of short stripes 25a, 25b and 25c, when the rotor 19 rotates, the photosensitive element receives light intermittently and produces an output in the form of a number of pulses representing the amount of rotation (the amount of axial movement) of the rear zoom component L4.

A number of electrical contacts 27 are arranged in the rear surface of the cross-wall of the body tube 1 to engage with respective electrical contacts on the camera housing when the lens mounting is attached to the camera body, and are connected through lead wires 27a to the coils 30, 31 and 20 of the two motors and the photo-detector 26.

A bellows 35 made of elastic material is water-tightly mounted at its rear end to the rear end of the outer surface of the body tube 1 by a pressor ring 36 and at its opposite end to the zoom barrel 2 at a point near the rear end thereof by a pressor ring 37.

The operation of the lens mounting mechanism of FIGS. 1 to 3 is as follows: it is desired to vary the focal length, the operator, by grasping the rubber knurl 2f, moves the zoom barrel 2 axially back and forth. This motion is transmitted through the cam 1b-and-follower 4 connection and the cam 1c-and-follower 14 connection to move the first lens cell 13 and the sleeve 3 axially in differential relation depending on the shapes of the camming slots 1b and 1c and, at the same time, to rotate them about the optical axis. Meanwhile, the first and third lens components L1 and L3 are moved axially while the air separation therebetween is maintained constant. Therefore, all the axial air separations between the successive two lens components L1 to L5 are varied to effect zooming. FIG. 3 shows the telephoto setting of the zoom barrel 2. It is to be noted that though the diaphragm drive motor and the focusing lens drive motor are fixedly mounted on the body tube 1, the driving torques transmitted to the diaphragm unit 9 and the rear lens cell 28 are sustained by the axially elongated rod 12 and key, respectively.

In operating the diaphragm unit 9, current is supplied to either one of the coils 30 and 31; thereby, magnetic poles are exerted in the stator 29. Meanwhile, the permanent magnet ring 34 has an equal number of poles to the number of poles in the stator 29. The permanent magnet ring 34 is, therefore, rotated by a prescribed angle for every one pulse of current supplied to the coil 30 or 31. This rotation is transmitted through the rod 12 to the diaphragm blade drive ring 11; thereby the size of aperture opening of the diaphragm is adjusted to presetting.

To perform focusing of the zoom lens L1 to L5, the rearmost zoom component L4 is made to move by supplying current to the brushes 22 of the focusing lens drive motor and therefrom through the commutator 23 of the rotor 19 to the coil 20; thereby the coil 20 is polarized. Since the permanent magnet 17 has at least two poles, they repel or attract the magnetic poles of the coil 20 so that the rotor 19 is driven to rotate about the optical axis. This rotation is transmitted through the key 24 to the rear lens cell 28 and therefrom by the meshing engagement of the helicoids 28a and 3a to axially move the focusing component L4.

The amount of rotation of the rotor 19 is measured by the pulse substrate 25 and the photo-detector 26 in the form of a number of pulses produced from the photosensitive element thereof. This information is fed back to a lens control system (not shown); thereby, the focusing adjustment is automatically controlled.

The function of correcting the deviation of the sharp image from the focal plane as zooming takes place is next explained. When the zoom barrel 2 is axially moved, the double-tubular inner sleeve 3 is not only axially moved, but also rotated about the optical axis, the combined movement being shown by a helical path: 4A→4B→4C of the cam follower pin 4 in FIG. 1. Similarly, the photo-detector 26 changes its position continuously in a path: 26A→26B→26C relative to the rotor 19 which s restrained from axial movement. Therefore, a change in the focal length causes a change in the pitch of the stripes on the pulse substrate 25 to which the photo-detector 26 faces as 25a→25b→25c. It should be noted here that a change in the angular position of the photo-detector 26 about the optical axis results in a pitch error. However, because it is usual that zooming is followed by focusing, there is no need to sense the pulsated light during zooming. Therefore, it does not lead to erroneous measurement of the object distance. Even in the converse case when focusing is followed by zooming, the focusing positioned is re-adjusted for the changed focal length. Therefore, no misreading of the pulses occurs. It is also to be noted that since the focal length varies continuously, the number of rows of stripes on the pulse substrate 25 may be very increased. In actual practice, however, if the pulse counting which should be carried out with the pitch of the first stripe row 25a is done with the different pitch of the second row 25b, it will of course happen that the focusing component is stopped in a different position from the indicated one, but the focusing adjustment is recycled from that different position. After a number of excursions, the focusing component finally enters the depth of focus and stops there, provided that the difference in pitch between the adjacent two rows is so determined. From experiments, it has been found that in most cases, only one surplus cycle of distance measuring operation suffices for bringing the image into sharp focus, and it takes a mere time of about several tens of milliseconds wastefully. Therefore, the use of only three rows of stripes on the pulse substrate 25 assures high enough accurate and reliable focusing adjustment.

Though, in the foregoing embodiment, as the means for detecting the amount of focus correcting movement use is made of the pulse substrate 25 and the photo-detector 26, it is also possible to use a combination of a magnetic resistor element and a magnetic taper or a permanent magnet piece, or other suitable sensors.

The present invention has a great advantage that a change in the ratio of the focusing movement to the axial movement of the image plane resulting from a change in the focal length can be corrected without recourse to electrical circuit means of large scale including a position sensor, by using simple and inexpensive means as a pulse substrate having a few patterns of different pitch.

Figure 4:
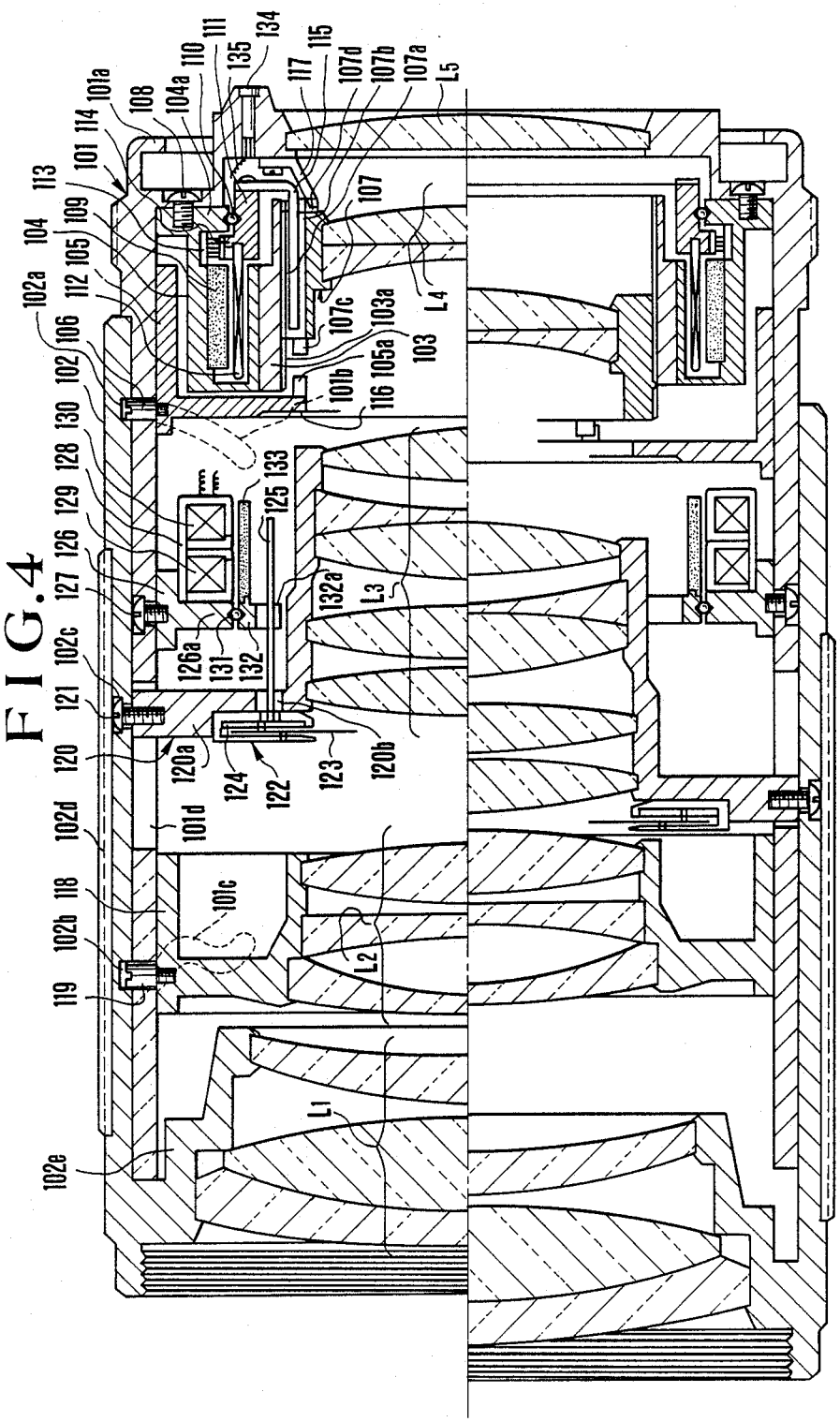
FIG. 4 is a longitudinal section view of another embodiment of the invention.
Figure 5:
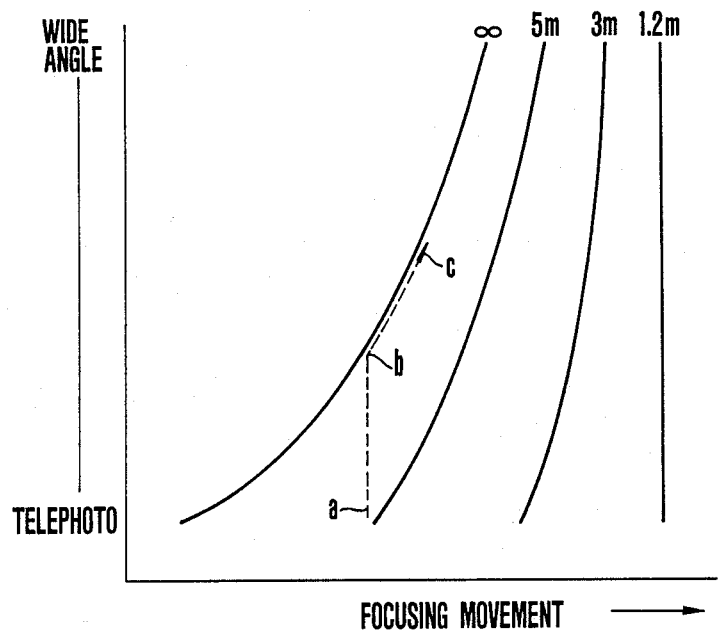
FIG. 5 is a graph illustrating the interaction between zooming and focusing movements in the zoom lens optical system of the rear focusing type.

FIGS. 4 and 5 illustrate another embodiment of the invention which accomplishes the above-stated third object. FIG. 4, in longitudinal section view shows a mechanical mounting for a rear focusing type zoom lens with the upper half in a focused position to the minimum object distance in the wide angle end and the lower half in another focused position to infinity in the telephoto end.

A body tube 101 attachable to a camera body (not shown) by a bayonet coupling 101a at the rear end thereof holds a lens component L5 in a rear cross-wall thereof, and is provided with camming slots 101b and 101c and an axially elongated slot 101d, for controlling the zooming movements, formed in the main tubular section thereof. A zoom actuator 102, or an outer barrel with a knurled rubber coating 102d thereon, is axially movably fitted on the outer surface of the body tube 101 and is provided with inner camming grooves 102a and 102b and a penetration hole 102c through which a screw fastener 121 extends into a second lens cell 120. AT its frontmost position, there is shown a lens cell 102e containing a first lens component L1.

A stationary helicoid sleeve 103 is fixedly secured to the inner diameter of a hollow cylindrical coreless motor casing 104 and has female helicoid threads 103a cut in the inner surface thereof which meshes with male helicoid threads 107a cut in the outer surface of a rear movable lens cell 107 containing a fourth zoom component L4 which also serves as a focusing component. The motor casing 104 is fixedly secured to the front surface of the cross-wall by a screw fastener 108 and plays a role as a yoke necessary to form a magnetic circuit. An annular permanent magnet 109, a rotor 111 fitted in the inner diameter of a flanged portion 104a of the casing 104 through a ball bearing 110, and a coil 112 fixedly mounted on the front side wall of the rotor 111 in radial alignment with the permanent magnet 109 constitute part of the coreless motor 104. Brushes 113 on the inner surface of the casing 104 are in contact with a commutator 114 on the outer surface of the rotor 111, through which the coil 112 is supplied with current. An axially elongated driving torque transmission key 115 is connected at one end to the rotor 111 and is slidably engaged at the opposite end in an axial hole 107b of the rear lens cell 107.

A stopper sleeve 105 is fitted in the inner diameter of the body tube 101 and has a guide pin 106 screw-threadedly mounted on the outer surface thereof and extending through the camming slot 101b of the body tube 101 into the camming groove 102a of the zoom actuator 102, so that when the zoom actuator 102 moves axially, the stopper sleeve 105 is moved axially while being simultaneously rotated by the guide pin 106. A fixed diaphragm is fixedly secured to the front surface of the cross-wall of the stopper sleeve 105, the rear surface of which has a stopper extension 105a as one limiting member. The rear movable lens cell 107 has an axial extension 107c on the front radial wall thereof and another axial extension 107d on the rear radial wall thereof. When the front extension 107c abuts on the stopper extension 105a, the forward axial movement of the lens component L4 is limited. When the rear extension 107d abuts on another stopper member 117, as the opposite limiting member fixedly secured to the front surface of the cross-wall of the body tube 101, the rearward axial movement of the lens component L4 is limited.

A first lens cell 118 containing a second lens component L2 is fitted in the inner diameter of the body tube 101 and has a guide pin 119 screw-threadedly mounted to the outer surface thereof and extending through the camming slot 101c of the body tube 101 into the camming groove 102b of the zoom actuator 102. The second lens cell 120, containing a third lens component L3, is fitted with its flange 120a in the inner diameter of the body tube 101. The flange 120a has a radial extension passing through the longitudinally elongated slot 101d of the body tube 101 and fixedly secured to the zoom actuator 102 by the screw fastener 121. A diaphragm unit 122 is mounted on the front shoulder of the flange 120a and comprises, as well known in the art, blades 123 and drive ring 124. A drive connection rod 125 extends longitudinally of the rear surface of the drive ring 124 through an arcuate slot 120b provided through the wall of the flange 120a into a hole 132a in a rotor 132.

An annular support member 126, carrying a motor for driving the diaphragm unit 122, is fixedly fitted in the inner diameter of the body tube 101 by a screw fastener 127 and has a cross-wall whose rear surface fixedly carries a stator 128 and a pair of coils 129 and 130 constituting part of a hollow cylindrical stepping motor. The rotor 132 is rotatably fitted in the aperture of the cross-wall 126a through a ball bearing 131. An annular permanent magnet 133 is fixedly secured to the rotor 132 in radial alignment with the coils 129 and 130.

Electrical terminals 134 are arranged in the rear surface of the rear cross-wall of the body tube 101 to contact with inlets and outlets of a battery and signal sources in the camera body when the lens mounting is attached to the latter, and are connected through lead wires 135 to the motors and sensors (not shown).

The operation of the mechanical mounting of FIG. 4 is as follows: At first, when it is desired to vary the focal length, the operator axially moves the zoom actuator 102 back and forth by grasping the rubber knurl 102d. Since, the guide pin 106 of the stopper sleeve 105 engages in the cross point of the camming groove 102a of the zoom actuator 102 and the camming slot 101b of the body tube 101, and the guide pin 119 of the first lens cell 118 engages in the cross point of the camming groove 102b of the zoom barrel 102 and the camming slot 101c of the body tube 101 such axial movement of the zoom actuator 102 is transmitted to move the stopper sleeve 105 and the first lens cell 118 axially in differential relation depending upon the shapes of the camming slots while simultaneously rotating about the optical axis. Since, at this time, the front lens component L1 and the third lens component L3 in the second lens cell move axially along with the zoom barrel 102 while maintaining constant the axial air separation therebetween, all the air separations between the successive two lens components L1 to L5 vary with zooming. The lower half portion of FIG. 4 shows the telephoto end as changed from the wide angle end of the upper half portion by pushing the zoom actuator 102 forward. And, though the stator 128 and the coils 129 and 130 of the diaphragm drive stepping motor supported by the member 126 are fixedly secured to the body tube 101, the axial movement of the diaphragm unit 122 in unison with the second lens cell 120 with zooming does not result in breaking the operative connection to the motor with the help of the drive connection rod 125.

When the coil 129 or 130 is supplied with current, the stator 128 is polarized. Meanwhile, the permanent magnet 113 has similar poles to those of the stator 128. Therefore, the magnetic force exerted in the stator 128 and the magnetic force of the permanent magnet 133 attract or repel each other, rotating the rotor 132. By controlling the current supply to the coils 129 and 130 pulsatingly, the rotor 132 can be turned to a desired angle. This rotation is transmitted through the drive connection rod 125 to turn the diaphragm drive ring 124; thereby, the size of the aperture opening defined by the blades 123 is adjusted to a predetermined value.

Focusing is performed as follows: When current is supplied to the brushes 133 of the coreless motor 104, the current goes through the commutator 114 of the rotor 111 to the coil 112, thereby the coil 112 is polarized. And, since the permanent magnet 109 has at least two poles, the coil 112 reacts to rotate the rotor 111 about the optical axis. This rotation is transmitted through the key 115 to rotate the rear movable lens cell 107 about the optical axis. As the lens cell 107 rotates, the meshing of its helicoid threads 107a with the helicoid threads 103a of the helicoid sleeve 103 causes axial movement of the rear zoom component L4 to effect focusing.

Next explanation is given to the function of limiting the range of focusing movement of the component L4. As has been described in connection with the third object of the invention, for the lens system having such a dynamic characteristic as shown in FIG. 5, it becomes necessary to use mechanical stoppers of non-linear shape at one limit for an infinitely distant object and of linear shape at the opposite limit for a close object (1.2 meters). (This condition can be converted when the optical layout changes).

In case when the rear zoom component L4 is made to move axially rearward to effect focusing down to shorter object distances, therefore, that stopper member which limits the rearward focusing movement can only be fixed in position relative to the body tube 101, regardless of variation of the focal length. For this purpose, a stopper member 117 is arranged on the front surface of the rear cross-wall of the body tube 101 to extend into the path of movement of the rearward extension 107d of the rear movable lens cell 107. With an object at infinity, on the other hand, the focusing position of the fourth lens component L4 must be varied as a non-linear function of the focal length of the entire system. Upon consideration of the fact that the axial position of the lens cell for the rear zoom component varies with the focal length non-linearly depending on the shape of the camming slot 101c, the opposite limiting member, in the embodiment of FIG. 4, the stopper 105a is arranged on the front surface of the cross-wall of the stopper sleeve 105 to axially rearwardly extend into the path of rotation of the front extension 107c of the rear movable lens cell 107. Thus, when zooming from the wide angle position in the upper half portion of FIG. 4 to the telephoto position in the lower half portion, the front terminal end of movement of the component L4 is brought forward with an increase in the total focusing movement. It is to be noted that while the stopper sleeve 105 moves by non-linearly varying axial distances with variation of the focal length, the front extension 107c moves by a proportional distance to the angle of rotation of the lens cell 107 due to the helicoid type torque transmission 107a. To absorb the discrepancy between the non-linear and linear changes of the former and latter distances, the axial lengths of the stopper 105a and the front extension 107c are made long enough. Now assuming that in the telephoto position, the current supply to the coreless motor 104 is cut off to set the mechanical mounting for the lens in the visual focusing mode, then when zooming proceeds toward the wide angle end, it is until a point "b" from the point "a" that the stopper 105a does not come to contact with the front extension 107c, leaving the lens component L4 standstill, but from the point "b" to a point "c" that the stopper 105a pushes the front extension 107c in a direction about the optical axis. Due to the helicoid coupling of the lens cell 107 with the stopper sleeve 105, the lens component L4 is allowed to retreat axially so that no damage occurs. Conversely, when zooming goes from the wide angle to the telephoto end, the stopper 105a moves merely away from the front extension 107c, giving rise to no problem. It is also to be noted that when in the automatic focusing mode, as the front extension 107c vigorously strikes the stopper 105a, because the mass of the zoom actuator 102 and the parts associated therewith is far heavier than the rear lens cell 107, the stopper sleeve 105 hardly changes its position along with the stopper 105a.

Another advantage of the invention is that the safety mechanism for limiting the variable total focusing movement with zooming which is essential to the rear focusing type zoom lens can be constructed in a relatively simple form.

What is claimed is:

1. A zoom lens assembly comprising:
   (a) a body tube;
   (b) a zoom barrel fitted on said body tube;
   (c) a lens component for varying an image magnification, with cooperation of other lens components, by moving said zoom barrel, and for a focusing function, and a lens holder holding said lens component;
   (d) a movable sleeve arranged, upon zooming of said zoom barrel, to move, said movable sleeve being screw-threaded connected to said lens holder so that said lens holder is moved by movement of said movable sleeve;
   (e) a motor for driving said lens holder, a rotor of said motor being operatively connected to said lens holder by a drive connection member, and said rotor obtaining a prescribed amount of rotation per unit driving signal; and
   (f) detection means for supplying to said motor a positional signal of a predetermined density indicating a position to which the lens component has moved in focusing, and for changing the density of the positional signal in correspondence to a change in focal length of said zoom lens assembly from one end to the other end of a zooming range thereof.

2. A zoom lens assembly according to claim 1, wherein said detection means includes a light-projecting element and a light-receiving element, and a pattern portion for reflecting light from said light-projecting element;
   said pattern portion having a plurality of patterns of desities varied continuously or stepwise as said zoom barrel moves from a wide angle end to a telephoto end and being positioned on an inner surface of said rotor; and
   said light-projecting element and said light-receiving element being positioned on said movable sleeve.

3. A zoom lens assembly comprising:
   (a) a body tube;
   (b) a zoom barrel fitted on said body tube;
   (c) a lens component for zooming, with cooperation of other lens components, when said zoom barrel moves, and for focusing, and a lens holder containing said lens compoennt;
   (d) a movable sleeve arranged, upon zooming of said zoom barrel, to move, said movable sleeve having an outer tubular portion fitted in said body tube and a helicoid tubular portion positioned at a prescribed radial distance from said outer tubular portion and screw-threadedly connected to said lens holder;
   (e) a motor for moving said lens component to correct a deviation of a focusing position thereof resulting from a change of a focal length of said zoom lens assembly;
   said motor being arranged in a space formed by said outer tubular portion and said helicoid tubular portion of said movable sleeve; and
   (f) means for drivingly connecting a rotor of said motor to said lens holder.

4. A zoom lens assembly according to claim 3, wherein said motor includes:
   a hollow cylindrical permanent magnet;
   a hollow cylindrical exciting roll concentric to said permanent magnet; and
   means for supplying electrical power to said exciting coil,
   said permanent magnet and said exciting coil being arranged in said space between said outer and said helicoid tubular portions of said movable sleeve,
   said exciting coil being rotatably supported on a stationary portion of said assembly by a bearing, and
   said exciting coil being drivingly connected to said lens holder by a key member fixedly secured at one end to said exciting coil and slidingly engaged at an opposite end thereof in a key groove provided in said lens holder.

5. A zoom lens assembly comprising:
   (a) a body tube;
   (b) a zoom barrel fitted on said body tube;
   (c) a lens component for zooming, with cooperation of other lens components, when said zoom barrel moves, and for correcting a deviation of an image plane from a focal plane resulting from zooming, and a lens holder containing said lens component;
   (d) a movable sleeve arranged, upon zooming of said zoom barrel, to move, said movable sleeve being screw-threadedly connected to said lens holder;
   (e) a motor for driving said lens holder, said motor including a stator portion fixedly secured to said body tube and a rotor portion drivingly connected to said lens holder, and said motor moving said lens holders by a prescribed distance per unit driving signal applied to said motor; and
   (f) detection means for determining a magnitude of the driving signal for said motor depending on a focal length of the zoom lens assembly, said detection means having a signal generating portion associated with said rotor portion of said motor and a signal detection portion associated with said movble sleeve, said signal generating portion being of substantially constant density during focusing and of variable density during zooming.

6. A zoom lens assembly according to claim 5, wherein said movable sleeve is helicoid-connected to said lens holder, said stator portion of said motor is formed to a hollow cylindrical permanent magnet, and said rotor portion is a hollow cylindrical exciting coil arranged in concentric relation to said hollow cylindrical permanent magnet and to an optical axis, and said hollow cylindrical permanent magnet is arranged on an outer surface of that portion of said movable sleeve which is screw-threadedly connected to said lens holder.

7. A zoom lens assembly according to claim 5, wherein said signal generating portion of said detection means has a pattern of reflective and non-reflective areas alternating with each other in a circle with its center at the optical axis, and a plurality of such patterns having different pitches between the reflective and non-reflective areas are arrayed longitudinally side by side, and said signal detection portion comprises a light emitting part for projecting light onto said patterns and 2 photosensitive part for receiving the projected light reflected from said patterns.

8. A zoom lens assembly comprising:

(a) a body tube;
(b) a zoom barrel fitted on said body tube;
(c) a zoom lens component for varying an image magnification, with cooperation of other lens components, by a zooming operation of said zoom barrel, and a lens holder;
(d) a lens component among said other lens components for correcting the deviation of an image plane from a focal plane resulting from an image magnification varying function of said zooming operation, and a lens holder containing said correcting lens component;
(e) a motor for moving said correcting lens component, said motor including a multi-layer hollow yoke fixedly secured to said body tube, a hollow permanent magnet contained in the hollow portion of said yoke, a hollow exciting coil and means for supplying electrical power to said coil;
(f) a helicoid sleeve fixedly secured to an inner tubular portion of said multi-layer hollow yoke and screw-threadedly connected to said correcting lens component holder; and
(g) means for drivingly connecting said exciting coil of said motor to said correcting lens component holder.

9. A zoom lens assembly according to claim 8, further comprising:

means for limiting a range of movement of said correcting lens component, said limiting means including a stopper sleeve arranged, upon zooming of said zoom barrel to move axially to abut said correcting lens component holder.

* * * * *